United States Patent [19]

McMaster

[11] Patent Number: 4,688,522

[45] Date of Patent: Aug. 25, 1987

[54] FLUID POWER TRANSFER DEVICE AND FUEL SYSTEM THEREFOR

[76] Inventor: Harold A. McMaster, 707 Riverside Dr., Woodville, Ohio 43469

[21] Appl. No.: 877,142

[22] Filed: Jun. 23, 1986

Related U.S. Application Data

[62] Division of Ser. No. 754,985, Jul. 15, 1985, abandoned.

[51] Int. Cl.$^4$ .................. F02B 75/12; F02B 53/00
[52] U.S. Cl. ........................... 123/1 A; 123/205; 123/241; 123/243
[58] Field of Search ............ 123/1 A, 205, 435, 241, 123/243; 418/193, 195

[56] References Cited

U.S. PATENT DOCUMENTS

| | | | |
|---|---|---|---|
| 763,963 | 7/1904 | Cobb | 418/193 |
| 764,465 | 7/1904 | Hendricks | 418/193 |
| 3,150,645 | 9/1964 | Mrstik et al. | 123/1 A |
| 4,223,642 | 9/1980 | Okubo | 123/1 A |
| 4,327,688 | 5/1982 | Lowther | 123/435 |

OTHER PUBLICATIONS

"Super Power", pp. 85,86, L. Schreib, 1977.

*Primary Examiner*—E. Rollins Cross
*Attorney, Agent, or Firm*—Brooks & Kushman

[57] ABSTRACT

A fluid power transfer device includes a pair of rotors and vanes mounted for rotation in a hollow housing having an equatorial plane wherein conical faces of the rotors rollingly engage each other to form a line contact and wherein a hinge pin which hingedly connects the vanes is constrained to rotate in the equatorial plane of the housing by two pairs of guide shoes. The guide shoes are slidably received within grooves formed on the inner surface of the housing and each of the hinged vanes in slidably received and connected to its guide shoes within its respective rotor. The conical faces and the housing cooperate to define a working chamber which is divided into working compartments by the hinged vanes and the line contact. The rotors transfer power between their respective shafts and an operating fluid introduced into one of the working compartments. A fuel system is also disclosed for use with the device when operated as an engine.

4 Claims, 11 Drawing Figures define a working chamber in which an operating fluid is received. The vane extends between the rotor and the housing to divide adjacent portions of the working chamber. The device further comprises means for substantially constraining rotation of a portion of the vane to the equatorial plane of the housing. The rotor transfers power between the operating fluid and the shaft.

FLUID POWER TRANSFER DEVICE AND FUEL SYSTEM THEREFOR

This a divisional of co-pending application Ser. No. 754,985, filed on July 15, 1985, now abandoned.

TECHNICAL FIELD

This invention relates to fluid power transfer devices and fuel systems therefor and, in particular, to fluid power transfer devices including at least one rotor mounted by a shaft in a housing wherein the rotor transfers power between an operating fluid introduced into the housing and the shaft.

BACKGROUND ART

Rotary pumps and engines are machines which have rotary elements which do work. Rotary engines include a piston which rotates in a cylinder to convert energy into mechanical force or motion. Rotary pumps include a pair of members in rotational contact to draw a fluid therein through an inlet port and force the fluid out through an exhaust port.

One well-known type of rotary engine is the Wankel engine which comprises a rotary-type internal combustion engine having a rotor and an eccentric shaft. The rotor moves in one direction around a trochoidal chamber containing peripheral inlet and exhaust ports. The rotor divides the chamber volume into three compartments.

DISCLOSURE OF THE INVENTION

An object of the present invention is to provide an improved rotary, fluid power transfer device which is adapted to provide significantly more power per working displacement and significantly more working displacement per housing volume than conventional rotary devices.

Another object of the present invention is to provide an improved fluid power transfer device including at least one rotor and one vane mounted for rotation by a shaft within a spherical housing having an equatorial plane and means for substantially constraining rotation of a portion of the vane to the equatorial plane of the housing.

Yet still another object of the present invention is to provide a fluid power transfer device including a pair of rotors mounted by their respective shafts within a spherical housing having an equatorial plane and polar axes wherein vanes hingedly interconnected by hinge means permit rotation of the rotors about their respective shaft axes which are inclined to the polar axes as the shafts rotate and wherein means are provided for substantially constraining rotation of the hinge means to the equatorial plane of the housing.

Still further, another object of the present invention is to provide an improved fuel system for a rotary engine generally of the type described herein.

In carrying out the above objects and other objects of the present invention, a fluid power transfer device, constructed in accordance with the present invention, comprises a spherical housing having an equatorial plane and polar axes, a shaft mounted for rotation about an axis inclined to the polar axes, and a rotor received within the housing and mounted by the shaft for rotation. A vane is mounted by the rotor for rotation. The vane permits rotation of the rotor as the shaft rotates. The rotor has a face that cooperates with the housing to define a working chamber in which an operating fluid is received. The vane extends between the rotor and the housing to divide adjacent portions of the working chamber. The device further comprises means for substantially constraining rotation of a portion of the vane to the equatorial plane of the housing. The rotor transfers power between the operating fluid and the shaft.

Further, in carrying out the above objects and other objects of the present invention, a fluid power transfer device, constructed in accordance with the present invention, comprises a spherical housing having an equatorial plane and polar axes and having a concave inner surface. First and second shafts extend through the housing and are mounted for rotation about first and second axes inclined to the polar axes, respectively. A pair of rotors are received within the housing and are mounted by their respective shafts for rotation. Each rotor has a convex face that slides against the concave inner surface of the housing. First and second vanes and hinge means for hingedly connecting the vanes are mounted by their respective rotors for rotation. Each rotor has a conical face that rollingly engages the conical face of the other rotor to form a line contact with the housing and to define a working chamber in which an operating fluid is received. The line contact and the vanes extend between the housing and the rotors to divide adjacent portions of the working chamber into working compartments. The vanes permit rotation of the rotors as their respective shafts rotate. The device further comprises means for substantially constraining rotation of the hinge means to the equatorial plane of the housing. The rotors transfer power between the operating fluid and the shafts.

A fuel system constructed to operate with a two-cycle engine generally of the type disclosed herein includes first means for introducing fuel into the working chamber, second means for introducing an oxidant of the fuel into the working chamber, the oxidant reacting with the fuel to explode in the working chamber and means adapted to be operatively associated with the engine for controlling the first and second means for introducing. The energy released by the reaction rotates the shaft of the engine.

Preferably, each of the rotors includes a channel extending inwardly from its conical face for slidably receiving its respective vane.

Depending on the particular application, the device may operate, for example, as a rotary pump or as a rotary engine. When operated as a 2 cycle rotary engine (i.e. without intake and compression strokes) the power stroke of the engine may be 270° in duration per 360° rotation of the shafts for each end of the vanes, thereby doubling the output power per given displacement volume. Also, by using liquid fuel and oxidant, the engine can deliver four times the power for a given displacement that a four cycle engine would deliver. Such a rotary engine would be equivalent to a six-cylinder, four-cycle piston engine which also averages 540° of power stroke per revolution.

Also, the ratio of working volume of the device to overall volume is very favorable due to its compact spherical design. An improvement by a factor of 3 to 4 is possible with the design as compared to a four-cylinder, four-cycle piston engine.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
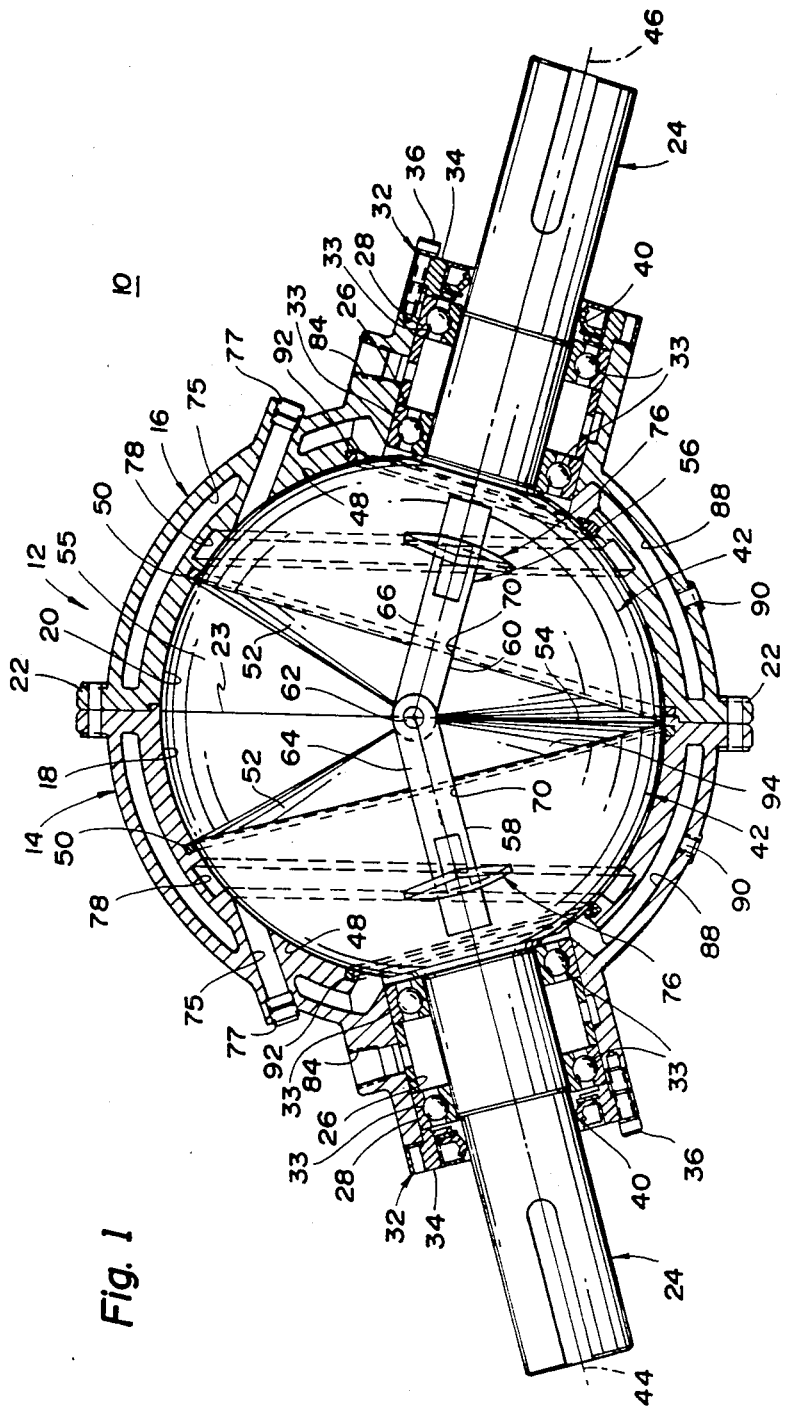
FIG. 1 is a sectional view taken through the axes of rotation and the polar axes, perpendicular to the equatorial plane of a fluid power transfer device constructed in accordance with the present invention.
Figure 2:
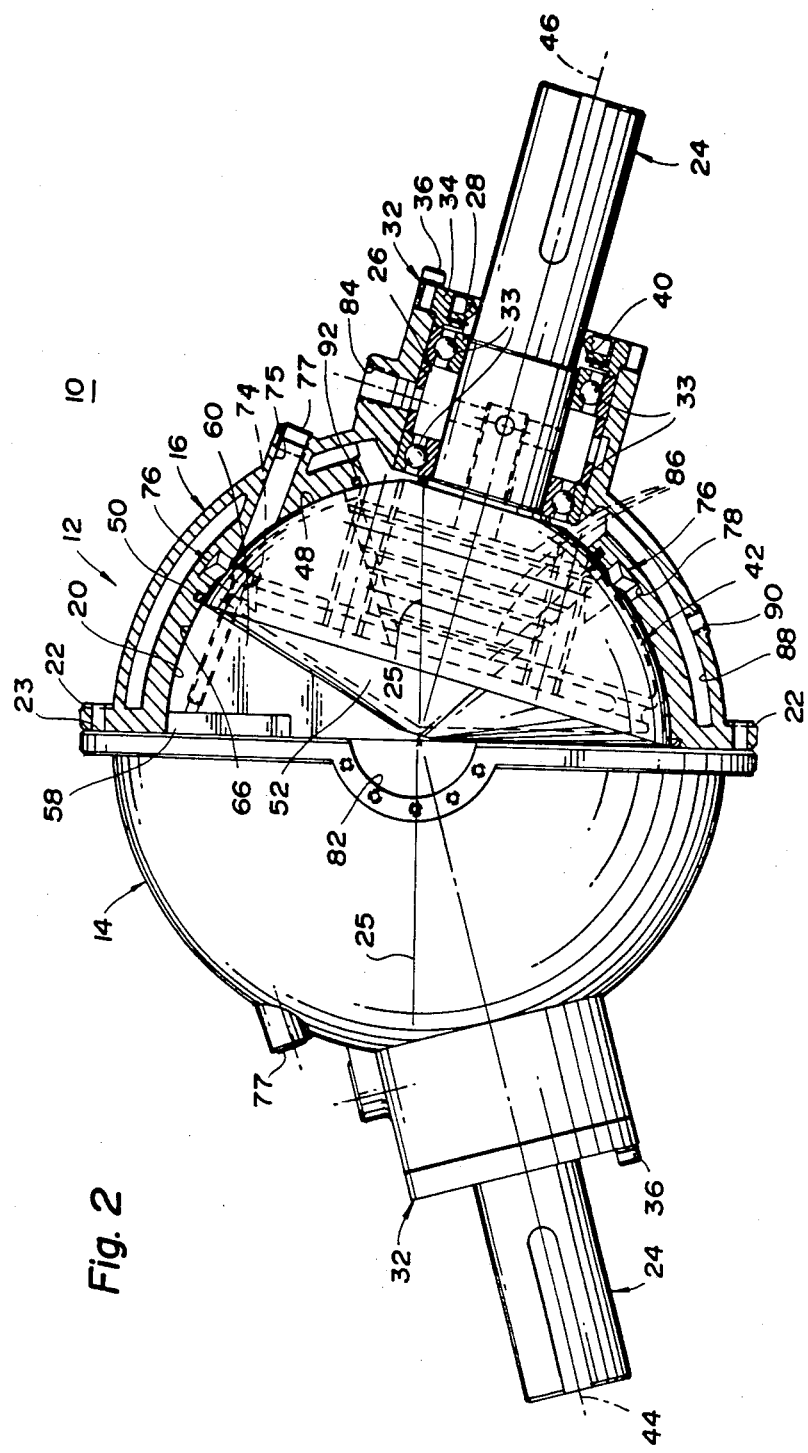
FIG. 2 is a view similar to FIG. 1 but with only one-half of the device being shown in section and with the rotors rotated 90° from their position shown in FIG. 1.

Referring now to the drawings, there is illustrated in FIGS. 1 and 2 an embodiment of a fluid power transfer device, collectively indicated by reference numeral 10, constructed in accordance with the present invention. As shown in the figures, the device 10 is specifically embodied as a rotary engine. However, the device can also be embodied, for example, as a rotary pump or other machine, as will be evident to persons skilled in this art.

The device 10 comprises a hollow, spherical housing, generally indicated at 12, including first and second housing sections, generally indicated at 14 and 16, respectively. The housing sections 14 and 16 have concave, generally spherical, smooth inner surfaces 18 and 20, respectively. The housing sections 14 and 16 are adapted to be screwed or bolted together at a plurality of circumferentially-spaced positions 22 to hold the two sections 14 and 16 together along their common equatorial plane 23.

The device 10 also comprises a pair of shafts, generally indicated at 24. The shafts 24 are inclined to polar axes 25 of the housing 12. The shafts 24 extend through spaced, circular apertures 26 formed in the housing sections 14 and 16, respectively.

The shafts 24 are supported for rotation within the apertures 26 by ball bearings 28 of a pair of bearing retainers, generally indicated at 32. Each retainer 32 includes a base member 34, which is mounted on the exterior surface of the housing 12 by bolts 36 at spaced locations adjacent the outer periphery of its respective aperture 26. Each retainer 32 also includes an annular oil seal 40 supported by its respective base member 34 about its respective shaft 24 to seal the shafts 24.

The device 10 further comprises a pair of rotors, generally indicated at 42, which are received in the housing 12. The rotors 42 are integrally formed on the inner ends of their respective shafts 24 for rotation therewith about their respective rotor axes 44 and 46 which are shown inclined 15° with respect to the polar axes and to each other by an angle of 30°. However, it is to be understood that other angles may be used.

The rotors 42 have convex outer surfaces or faces 48 which slide against the concave inner surfaces 18 and 20 of the housing sections 14 and 16, respectively. Circular seals 50 are held in circular grooves formed in the inner concave surfaces 18 and 20 of their respective sections 14 and 16 to help confine combustion gases to working compartments, as will be described in detail hereinbelow.

Each of the rotors 42 also has a conical face 52 that rollingly engage the conical face 52 of the other rotor and cooperates therewith to form a line contact 54 which remains stationary as the rotors 42 and the shafts 24 rotate. The concave inner surfaces 18 and 20 and the conical faces 52 define a working chamber 55 which is 60° wide from cone to cone opposite the line contact 54.

Figure 3:
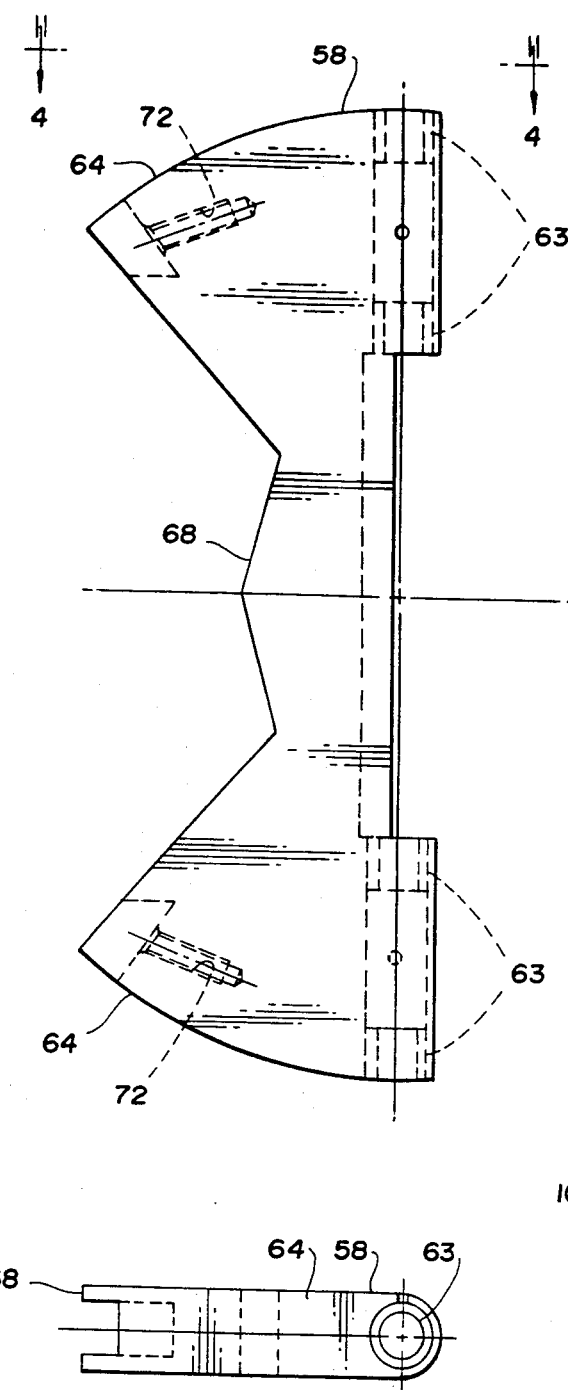
FIG. 3 is a side elevational view of a first vane for use in the device.
Figure 5:
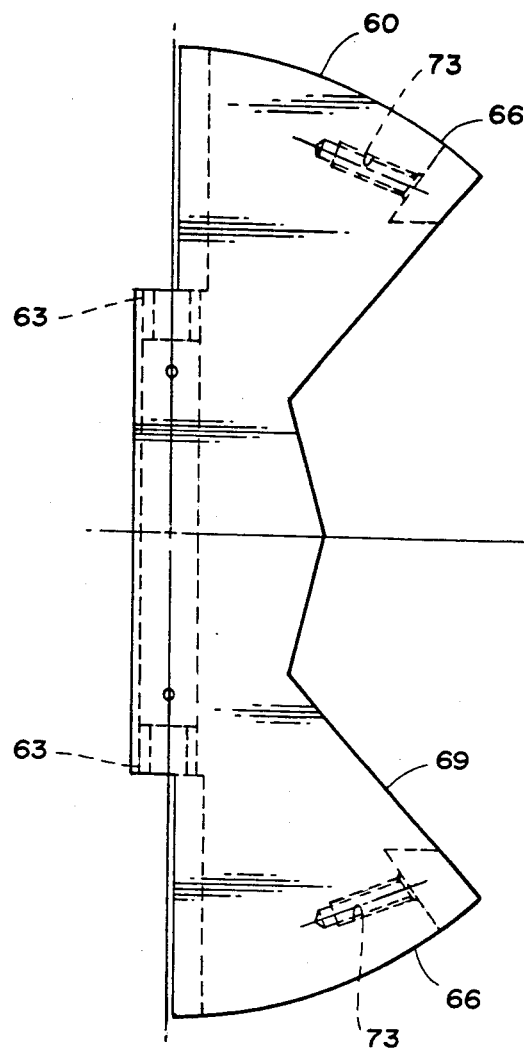
FIG. 5 is a side elevational view of a second vane for use in the device.
Figure 6:
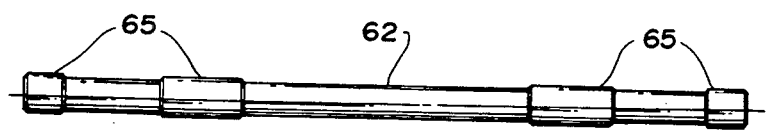
FIG. 6 is a side elevational view of a pin for hingedly connecting the first and second vanes.
Figure 7:
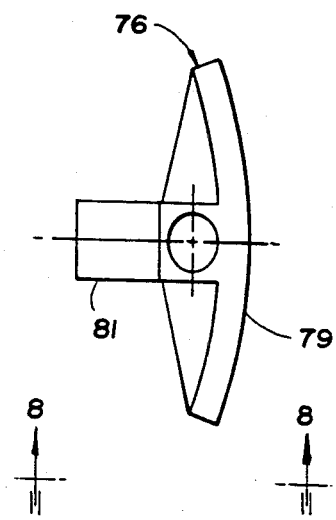
FIG. 7 is a side elevational view of one of the guide shoes of the device.
Figure 8:
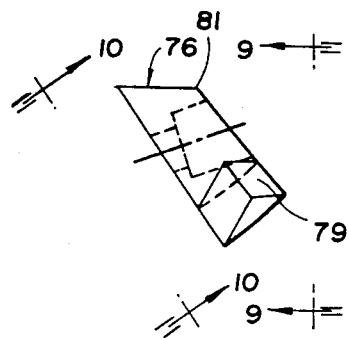
FIG. 8 is a view of the guide shoe taken along the lines 8—8 of FIG. 7.
Figure 9:
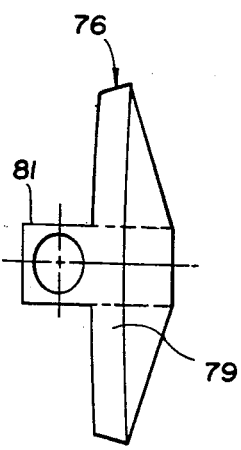
FIG. 9 is a view of the guide shoe taken along the lines 9—9 of FIG. 8.
Figure 10:
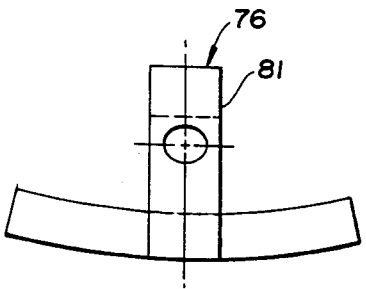
FIG. 10 is a view of the guide shoe taken along the lines 10—10 of FIG. 8.

The device 10 also comprises a vane assembly, generally indicated at 56. The vane assembly 56 comprise first and second "bow-tie" shaped vanes 58 and 60 as shown in FIGS. 3 and 5, hingedly connected together by a hinge pin 62, as shown in FIG. 6. Bushings 63 rotatably support enlarged portions 65 of the pin 62 in cylindrical portions of the vanes 58 and 60.

Top and bottom convex surfaces 64 and 66 of the vanes 58 and 60, respectively, slide against the concave inner surfaces 18 and 20, respectively, of the two housing sections 14 and 16. The axes 44 and 46 and the center of the hinge pin 62 meet at the center point of the housing 12. The vanes 58 and 60 and the line contact 54 cooperate in dividing the working chamber 55 into working compartments.

The vanes 58 and 60 are sealingly, slidably received and retained at their respective lateral sides 68 and 69 within grooves 70 formed in opposing conical faces 52 of the rotors 42. The grooves 70 extend between the conical faces 52 and the convex outer faces 48. Each of the vanes 58 and 60 also has a pair of threaded holes 72 and 73, respectively, formed at the tips of their respective lateral sides 68 and 69 to receive bolts 74 (only one of which is shown is FIG. 2) which secure the vanes 58 and 60 to a guide mechanism in the form of guide shoes, each of which is generally indicated at 76. The bolts 74 are inserted through access holes 75 formed completely through the housing 12 and the holes 75 are thereafter sealed with plugs 77.

The guide shoes 76, as best illustrated in FIGS. 7 through 10, run in their respective grooves 78 formed in the inner concave surfaces 18 and 20 of their respective sections 14 and 16. Each groove 78 is outside of the working chamber 55. Each guide shoe 76 includes a slide surface 79 which is a portion of a cone whose axis lies along the axis of the hinge pin 62. Each guide shoe 76 slides in its groove 78 against a surface which is a portion of a cone whose axis lies along its respective polar axis 25. Each guide shoe 76 also includes an apertured attachment portion 81 through which its respective bolt 74 extends to secure the shoe 76 to its respective vane. The guide shoes 76 keep the hinge pin 62 rotating in the equatorial plane of the housing 12 as the rotors 42 rotate and the vanes 58 and 60 rotate and slide within the grooves 70.

The housing sections 14 and 16 contain inlet and outlet ports. Only one-half of one outlet port is indicated at 82. One or more small inlet ports will penetrate the housing 12 near the equator and preferably within 60° from the line contact 54 for the injection of liquid fuel and oxidant.

Inlet passages 84 are provided in the housing 12 to permit cooling oil to flow therethrough and into passages formed in the rotors 42 as indicated by phantom lines 86 in FIG. 2. Thereafter, the oil circulates to coolant chambers 88 and out through outlets 90 in the housing 12. Oil seals 92 isolate the working compartments from the coolant oil.

In FIG. 1 the hinge pin 62 has rotated 90° since it was at the line contact 54 at which time there would be three compartments. Assuming that the illustrated end of the hinge pin 62 is moving upwardly, a working compartment 94 formed by the vanes 58 and 60, the line contact 54 and the housing 12 is expanding in a power stroke. At the same time, a similar compartment on the opposite side of the line contact 54 is contracting in an exhaust stroke. A working compartment defined by the upper surface of the vane assembly 56 as shown in FIG. 1 has reached its maximum volume and is about to enter an exhaust stroke as the opposite end of the hinge pin 62 lowers into the exhaust port in the housing 12.

After the hinge pin 62 has moved 60° from the line contact 54, the volume of the compartment 94 is only about 3% of maximum and, preferably, liquid $NH_3$ and $N_2O$ are injected separately through the inlet port and into the wedge-shaped compartment 94 where they explode spontaneously to raise the temperature and pressure of the gases trapped therein. In this way a power stroke with an expansion ratio of greater than 30 to 1 for high efficiency is started. If fuel injection continues until 90°, the expansion ratio will still be about 10 to 1 for greater power at lower efficiency.

Figure 11:
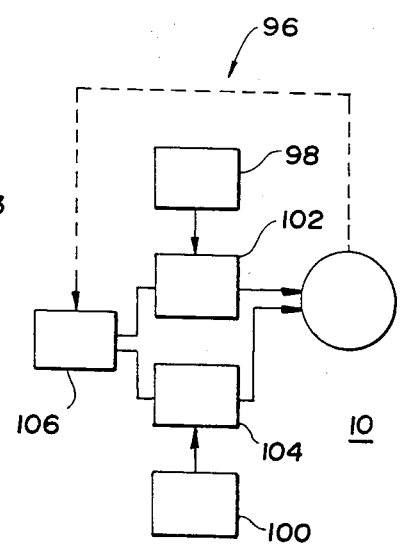
FIG. 11 is a schematic view of a fuel system, particularly adapted for use with the device when operated as a rotary engine.
Figure 4:
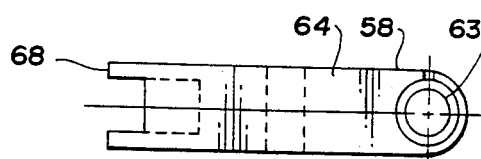
FIG. 4 is a top plan view of the first vane taken along line 4—4 in FIG. 3.

Referring to FIG. 11 there is illustrated a fuel system generally indicated at 96 for controllably introducing the fuel and its oxidant through the inlet ports and into the compartment 94. The fuel system 96 includes fuel and oxidant storages 98 and 100, respectively, and fuel and oxidant injectors 102 and 104, respectively, fluidly coupled thereto. A control mechanism 106 operatively associated with the device 10 controls operation of the injectors 102 and 104 so that the fuel and its oxidant are injected or sprayed into the compartment 94 at the correct time or times.

After 180° of hinge pin rotation from the line contact 54, the vanes 58 and 60 are flat and in the plane formed by the axes 44 and 46 and the line contact 54. At that point the vanes 58 and 60 span the 60° wide space between the conical faces 52 and the volume of the compartment 94 has expanded to 62° of maximum. At this time there would momentarily be only two compartments. At this point the vanes 56 and 60 are fully extended from their grooves 70 in the rotors 42, but are cantilevered from their opposite ends which are fully embedded in their grooves 70 at the line contact 54 and are adequately supported against the diminishing gas pressure.

Between 180° and 270° of hinge pin rotation from the line contact 54, the volume of the compartment continues to expand another 38% before the exhaust stroke begins. During this period of time the compartment is bounded by the faces 52, both ends of the vanes 58 and 60, and the housing 12. From this it can be seen that the strokes can be 270° long in this two-cycle engine for each of the two ends of the vanes.

From the above description it can also be seen that the rotors 42 rotate smoothly at constant velocity about their axes 44 and 46. The tangential velocity of the ends of the hinge pin 62 will only vary by 3.4%.

The vanes 58 and 60 rock into and out of their grooves 70 in sinusoidal fashion. In the right half of FIG. 2, the vane 60 is fully extended and is about to retract into its groove 70 creating its maximum acceleration force against the equator of the housing 12. At the same time, the vane 58 is likewise creating its maximum force but in the opposite direction so the acceleration forces tend to cancel each other.

The maximum forces occur when the vanes 58 and 60 are directly opposed in the plane of the axes 44 and 46 and there is no tendency for them to buckle at their hinge. At other times the hinge will be folded up 30° out of line at 90° rotation from the line contact 54. At that time there is no acceleration. In between the above two limits that portion of the vanes 58 and 60 which extend more than 15° from the faces 52 in the arc 90°–270° will exert acceleration forces toward the equator of the housing 12 tending to buckle the hinge. However, the ends of the vanes 58 and 60 in the arc 270°–0°–90° will tend to pull away from the equator of the housing 12 and flatten the hinge so the net buckling effect on the hinge is always zero.

The above-described device is free of unmanageable acceleration forces and operates smoothly as a true rotary engine. Furthermore, the design is simple with a minimum number of components and no valves or cams.

The fuel components, while not presently readily available, can be made by electrolysis of water and nitrogen from the air using solar photoelectricity. The fuel components react spontaneously and no starter, ignition system or compression stroke is needed.

Since intake and compression strokes use half the time in a 4 cycle engine, this two-cycle engine can deliver two times the power for a given displacement volume.

Since the compression stroke absorbs about one-half of the power stroke energy in a 4 cycle engine, by using liquid fuel and oxidant another factor of 2 improvement can be achieved so that the engine can deliver four times the power for a given displacement that a 4 cycle engine would deliver.

Furthermore, the ratio of working volume to overall volume is very favorable due to the compact spherical design without crankshaft, flywheel, crankcase and valve mechanism. Also, no starter is needed.

The fluid power transfer device 10 is shown in the figures as a rotary engine wherein the power stroke is 270° in duration per 360° of rotation of the shafts 24 for each end of the vanes. Consequently, the rotary engine shown is equivalent to a six-cylinder piston engine which would also average 540° of power stroke per shaft rotation. Also, the device could be constructed as a single hemisphere with a flat disc in the equatorial plane.

While the fluid power transfer device 10 has been shown and described as a positive displacement engine in which power is applied to do work by the conversion of specific type of energy into mechanical force and motion, it is to be understood that the fluid power transfer device may also take the form of a displacement pump which draws a working fluid into itself through an inlet port and forces the fluid out through an exhaust port upon rotation of the shafts 24.

While the best mode for carrying out the invention has been described in detail, those familiar with the art to which this invention relates will recognize various alternative designs and embodiments for practicing the invention as defined by the following claims. Particularly, other guide systems for constraining the hinge pin to the equatorial plane can be visualized.

What is claimed is:

1. A system including an internal combustion engine, the system comprising:
    a spherical housing having an equatorial plane and polar axes;
    a shaft mounted on the housing for rotation;
    a rotor received within the housing;
    a vane mounted for rotation, said rotor having a face that cooperates with the housing to at least partially define a working chamber, said vane extending between the rotor and the housing to divide adjacent portions of the working chamber;
    first means for introducing fuel into the working chamber;
    second means for introducing an oxidant of the fuel into the working chamber, the oxidant reacting with the fuel to explode in the working chamber;
    means operatively associated with the engine for controlling the first and second means for introducing; and
    means for substantially constraining rotation of a portion of the vane to the equatorial plane of the housing whereby the vane transfers energy released by the reaction to the shaft.

2. A system including an internal combustion engine, the system comprising:
    a spherical housing having an equatorial plane and polar axes;
    first and second shafts that extend into the housing and are mounted for rotation;
    a pair of rotors received within the housing;
    first and second vanes and hinge means for hingedly connecting the vanes, said rotors having faces that cooperate with the housing to at least partially define a working chamber, said vanes extending between the rotors and the housing to define adjacent portions of the working chamber;
    first means for introducing fuel into the working chamber;
    second means for introducing an oxidant of the fuel into the working chamber, the oxidant reacting with the fuel to explode in the working chamber;
    means operatively associated with the engine for controlling the first and second means for introducing; and
    means for substantially constraining rotation of the hinge means to the equatorial plane of the housing whereby the vanes transfer energy released by the reaction to the shafts.

3. A system including an internal combustion engine, the system comprising:
    a spherical housing having an equatorial plane and polar axes and having a concave inner surface;
    first and second shafts that extend through the housing and are mounted for rotation;
    a pair of rotors received within the housing, each of said rotors being mounted for rotation about a rotor axis inclined to its respective polar axis, each rotor having a convex face that slides against the concave inner surface of the housing;
    first and second vanes and hinge means for hingedly connecting said vanes, each rotor having a conical face that rollingly engages the conical face of the other roller and cooperates therewith to form a line contact and with the housing to define a working chamber, said line contact and vanes extending between the housing and the rotors to divide adjacent portions of the working chamber into at least two working compartments;
    first means for introducing fuel into the working chamber;
    second means for introducing an oxidant of the fuel into the working chamber, the oxidant reacting with the fuel to explode in the working chamber;
    means operatively associated with the engine for controlling the first and second means for introducing; and
    means for substantially constraining rotation of the hinge means to the equatorial plane of the housing whereby the vanes transfer energy released by the reaction to the shafts.

4. The system as claimed in claim 1 or claim 2 or claim 3 wherein at least one of said first and second means for introducing comprises an injector and wherein the fuel comprises liquid ammonia and the oxidant comprises liquid nitrous oxide to create a spontaneous explosion.

* * * * *